United States Patent [19]

Cunningham

[11] 4,251,374
[45] Feb. 17, 1981

[54] INTERCHANGEABLE FILTER APPARATUS

[76] Inventor: Noble Cunningham, Rte. #9, Mansfield, Ohio 44904

[21] Appl. No.: 59,427

[22] Filed: Jul. 20, 1979

[51] Int. Cl.³ ............................................. B01D 27/00
[52] U.S. Cl. ................................... 210/232; 210/239; 210/282; 210/454
[58] Field of Search ............... 210/232, 234, 235, 274, 210/282, 407, 435, 436, 450, 454, 289, 291, 239, 240

[56] References Cited

U.S. PATENT DOCUMENTS

| | | | |
|---|---|---|---|
| 2,078,524 | 4/1937 | Ashton et al. | 210/167 |
| 3,149,072 | 9/1964 | Silverman | 210/232 |
| 3,395,808 | 8/1968 | Offer | 210/239 |
| 3,416,669 | 12/1968 | Hubbard | 210/411 |
| 3,508,657 | 4/1970 | Cooper | 210/232 |
| 3,757,957 | 9/1973 | Smith | 210/486 |
| 4,054,517 | 10/1977 | Feltz et al. | 210/45 |
| 4,108,775 | 8/1978 | Wilkes et al. | 210/169 |
| 4,115,272 | 9/1978 | Mustafievich et al. | 210/266 |

*Primary Examiner*—Ivars C. Cintins
*Attorney, Agent, or Firm*—Biebel, French & Nauman

[57] ABSTRACT

A filtration apparatus is provided which is easily convertible to a bag, sleeve and disc, cartridge, or tube filter configuration. Additionally, the apparatus is adaptable to function as an ion exchange column. The apparatus includes a tank having a base with liquid and gas inlets. A removable cover also has liquid and gas inlets and an adapter onto which several different filter elements may be coupled including a bag filter, a disc and sleeve filter, a cartridge filter, a tube-type filter, and a strainer for when the apparatus is to be used as an ion exchange column. The tank is capable of having liquid flow through in either direction and can be pressurized or evacuated as needed.

9 Claims, 10 Drawing Figures

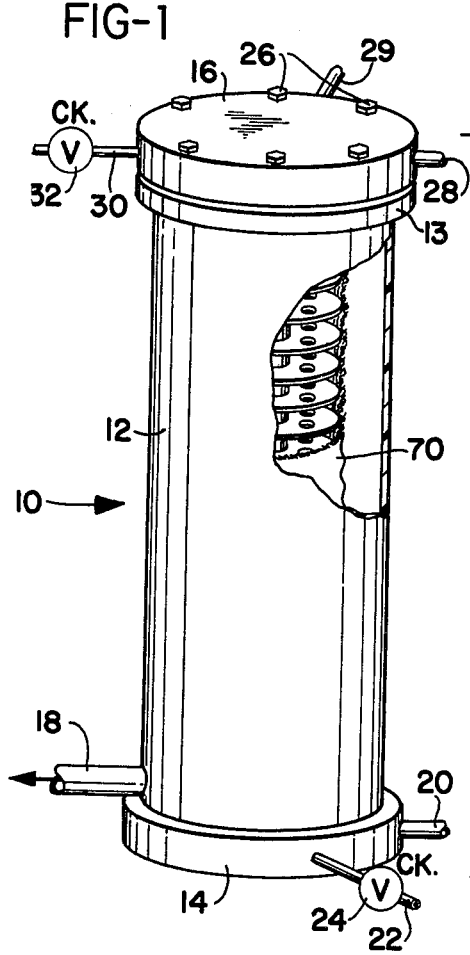
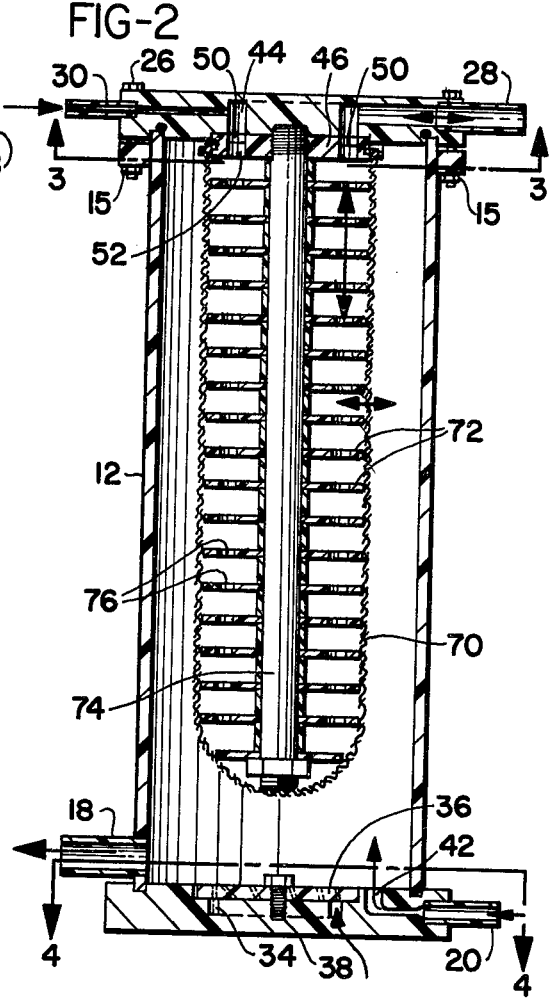

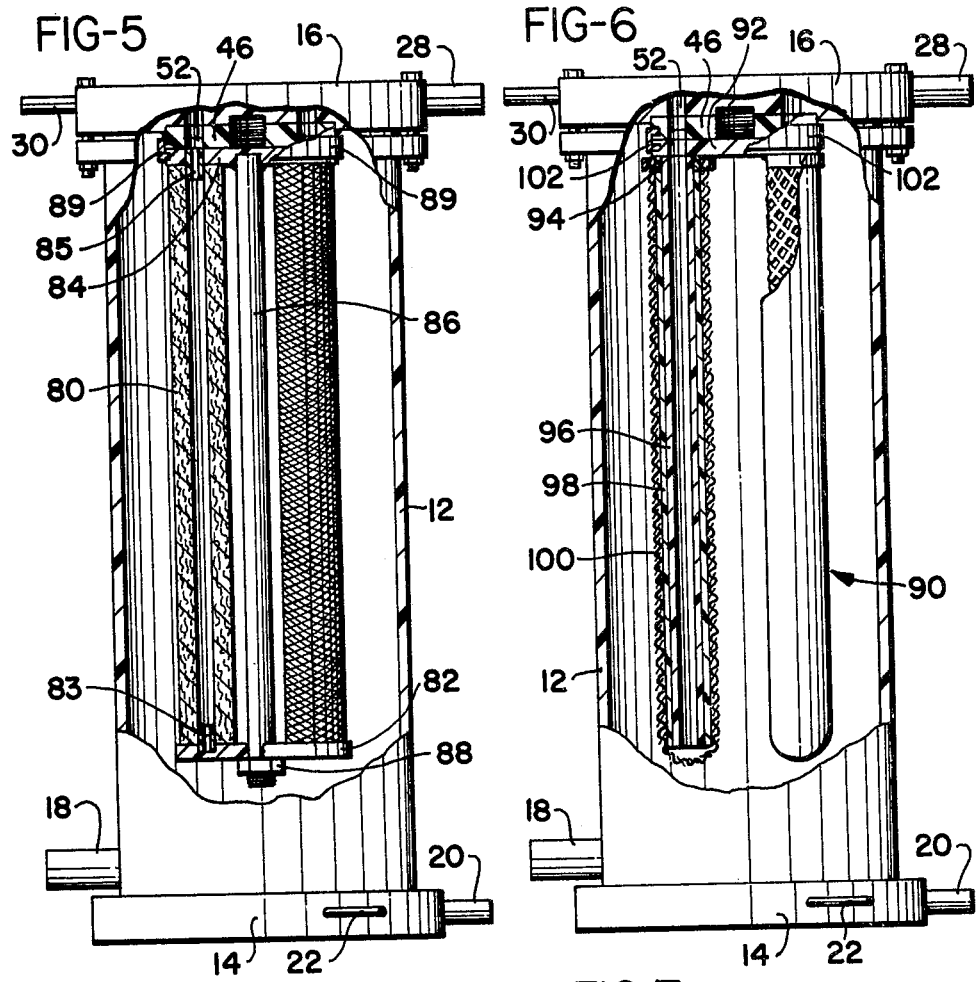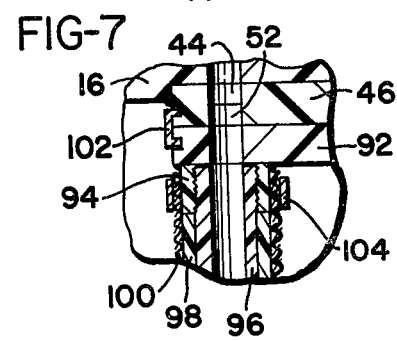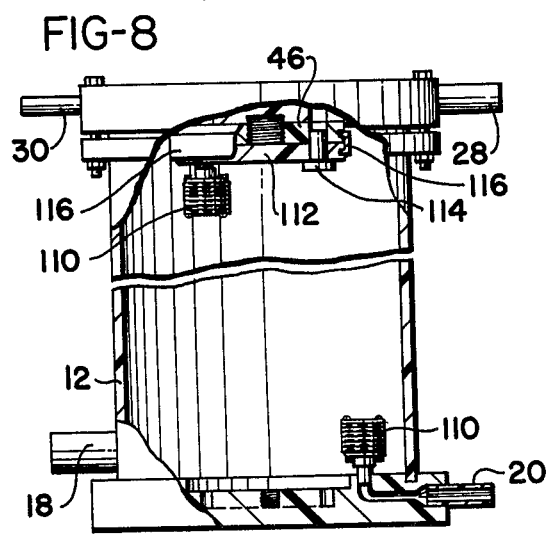

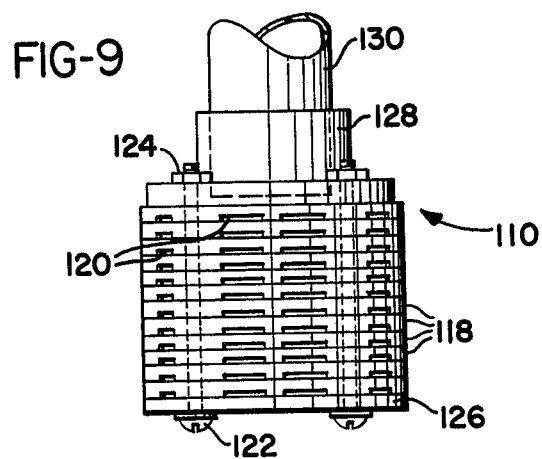
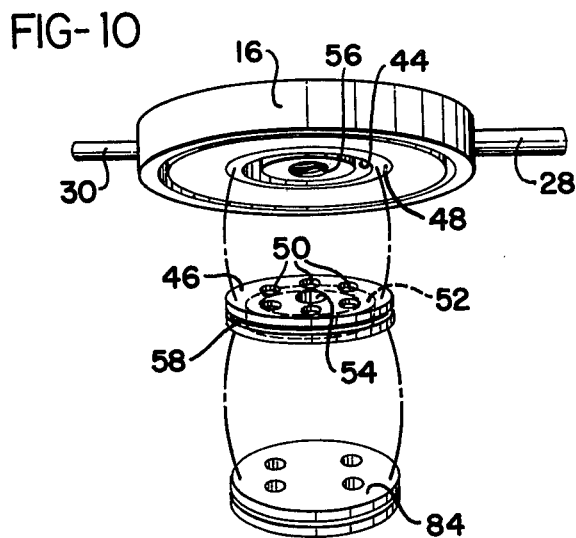

INTERCHANGEABLE FILTER APPARATUS

BACKGROUND OF THE INVENTION

This invention relates to the removal of particulate matter and dissolved solids from liquid, and more particularly to a convertible filter unit which can be easily changed to a bag, sleeve, cartridge, tube, or ion exchange structure.

Use of various types of filters to remove particulate solids from liquids is well known in the art. For example, gravity bag filters consisting of bags or pouches of filter fabric have long been used for simple straining operations involving flowing liquid through the bag from inside to outside leaving behind particulate contaminants. Such bag filters are available in a wide variety of both synthetic and natural fibers woven into many types of weaves. Sleeve or supported bag filters are also widely used to remove solid particles from liquids. Water or other liquid is flowed from the outside of the supported bag to the inside, leaving solid particles trapped on the surface of the fabric or other filtering medium.

Cartridge filter units designed either to be disposable after use and replaced or to be cleaned and reused have also found wide use in the art. These filters usually are of a hollow cylindrical configuration formed of woven or compacted fiber, paper, or other porous media. Flow through the filters is usually inwardly through the filtration media, with filtered fluid exiting the system through the hollow filter core.

Ion exchange columns, although operating as a chemical rather than physical process, have many structural and process similarities with filtration equipment. These columns are usually hollow cylinders containing the ion exchange resin material with fluid being directed downwardly through the resin. The ion exchange resin may be designed to remove dissolved cations, anions, or both from a fluid stream.

Each of these systems is generally effective for the particular water treatment process to which it is adapted. However, there may be a wide variety of different process demands facing a user of filtration equipment. These demands may vary from day to day. None of the above discussed types of filtration or ion exchange equipment is versatile enough to be adapted to all, or even a major portion, of the different process demands. For example, if only relatively coarse particles need be filtered at relatively low liquid flow rates, then a bag-type filter will be suitable. If, however, a smaller particle size filter is required, or the liquid stream is highly acidic or basic, or a high rate of filtration is required, a bag-type filter would not be suitable. However, replacing one type of filter with a new piece of equipment every time process requirements change becomes prohibitively expensive.

Accordingly, there is a need in the art for a filtration system which is highly versatile and easily adaptable to a wide variety of process requirements. Additionally, there is a need for a system which can achieve both physical (filtration) and chemical (ion exchange) separations of particulate and dissolved solids from liquid process streams depending on the particular need.

SUMMARY OF THE INVENTION

In accordance with the present invention, a filtration apparatus is provided which can be quickly and easily converted to a variety of different kinds of filtering operations as process demands change. The basic components of the apparatus include: (a) a tank which houses the filtering elements and which includes a sludge discharge outlet; (b) a base which includes at least one opening therein for the passage of liquids and at least one opening for the passage of air; and (c) a cover having at least one opening therein for the passage of liquids, at least one opening for the passage of air, and means adapted so that different filter elements may be fitted onto the cover.

These filter elements include bag filters, sleeve filters, and cartridge filters. For example, a bag filter may be slipped over the adapted means and secured either with a clamp, tie, or other suitable means. In this embodiment, the liquid opening in the cover serves as the inlet for liquid to be filtered. The cover is secured to the tank and liquid is pumped in through the liquid opening in the cover. Solid contaminants are caught and held in the filter bag while the filtered liquid passes through the bag and out of the apparatus through the liquid opening in the base of the tank or a second liquid opening in the cover of the tank.

In another embodiment, a sleeve and disc filter may be fitted onto the adapter means of a threaded shaft and coupling. In this embodiment, liquid to be filtered enters the liquid opening in the base of the apparatus and flows inwardly through the filter sleeve and out through the liquid opening in the cover. Solid contaminants are trapped on the outside surface of the sleeve. The contaminants are easily removed by passing air through the air opening in the cover outwardly through the sleeve in a reverse direction from that during the filtering operation. The solid contaminants are blown off of the exterior of the sleeve and drop to the bottom of the tank where they are removed through the sludge discharge outlet. Alternatively, contaminants may be removed by backwashing with liquid.

In still another embodiment, various types of cartridge filter arrangements using multiple cartidges are fitted to the adapted means in the cover of the tank. Liquid to be filtered enters through the liquid opening in the base of the tank, passes through to the interior of the filter elements and is removed through the liquid opening in the cover. Solid contaminants remain trapped on the exterior surfaces of the filter elements and, depending upon the particular design of the filter element, can be removed by an air blow-down procedure or a liquid backwash.

Finally, the filtering apparatus is easily converted to an adsorption or ion exchange apparatus by placing screens, strainers, or the like over the liquid openings in the base and cover of the tank. The tank is then filled with powdered carbon, charred wood or plant shells, activated charcoal, or cation or anion exchange resins. The apparatus may be operated with liquid flow in either direction through the tank. The liquid openings are designed such that they impart a tangential, vortical flow to the liquid entering the tank and avoid any channeling problems. The resin in the tank may be regenerated when required by flowing a regenerating liquid through the tank, usually in a direction opposite that used during normal operation. An air blow-down procedure is used to remove residual liquid from the tank either immediately prior to and/or after regeneration.

As can be seen, it is possible with the filtering apparatus of the present invention to change easily from one mode of filtration to another depending on the make-up and volume of the particular liquid to be filtered. If the size of the particles in the liquid to be filtered or the pH of the liquid varies, the apparatus may be rapidly changed over to a different pore size filter or a filter of a material which resists deterioration by acids or bases. If the volume of liquid to be filtered varies, the apparatus is adapted to be converted to a vacuum or pressure filtration operation. Additionally, if ion exchange is required to remove dissolved cations or anions, the apparatus is adapted to perform this function as well. Of cource, if required, a plurality of filter apparatuses may be connected in series.

Accordingly, it is an object of the present invention to provide a filtering apparatus which is adapted to be used for a wide variety of physical and chemical processes and is readily and rapidly changeable from one mode of filtration to another. Such adaptability avoids the need for the expense of purchasing several special single-purpose filtering units for changing needs.

These and other objects and advantages of the invention will become apparent from the following description, the accompanying drawings, and the appended claims.

BRIEF DESCRIPTION OF THE DRAWINGS

FIG. 1 is a perspective view of the filter apparatus of the present invention, partially cut away to show the interior of the apparatus;

FIG. 2 is a sectional side view of the apparatus of FIG. 1 illustrating a disc and sleeve filter element in place;

FIG. 3 is a sectional view of the tank cover taken along line 3—3 in FIG. 2;

FIG. 4 is a sectional view of the tank base taken along line 4—4 in FIG. 2;

FIG. 5 is a partially sectioned side view of the apparatus of the present invention illustrating a cartridge filter arrangement in place;

FIG. 6 is a partially sectioned side view of still another filter element arrangement in place in the present invention;

FIG. 7 is an enlarged sectional view of a portion of the apparatus shown in FIG. 6;

FIG. 8 is a partially sectioned side view of the present invention illustrating strainers in place for operation of the apparatus as an ion exchange column;

FIG. 9 is a side view of a strainer used in the practice of the present invention; and FIG. 10 is an exploded perspective view of the adapter means, cover, and a coupling element of the present invention.

DESCRIPTION OF THE PREFERRED EMBODIMENTS

As illustrated in FIGS. 1-4, the filter apparatus 10 of the present invention comprises a housing tank 12, a base 14, and a cover 16. The tank, base, and cover may be fabricated of any structurally rigid material. In a preferred embodiment, the tank, base, and cover are all fabricated of a sturdy polymeric material such as a rigid or semi-rigid polyvinyl chloride. A preferred fabrication material is Schedule 80 polyvinyl chloride. Tank 12 has a sludge discharge outlet 18, the operation of which will be more fully described below. Base 14 has at least one liquid-carrying conduit 20 and at least one gas-carrying conduit 22 communicating with the interior of tank 12. Depending upon the particular filter assembly in use and the desired mode of operation, these conduits may serve either as inlets or outlets. Gas-carrying conduit 22 has a check valve 24 located therein to insure that no liquid escapes from tank 12 through the wrong conduit. Base 14 may be permanently attached to tank 12.

As best shown in FIGS. 3 and 4, air conduit 22 is in fluid communication with an annular groove 34 in base 14. A perforated plate 36 is secured by bolt 38 over groove 34. A plurality of smaller passages 40 in plate 36 provide the pathway for air to enter tank 12 from base 14. In a preferred embodiment, these passages may be angled at an acute angle from vertical to impart a vortical motion to the gas entering the bottom of the chamber. Liquid enters or leaves the base of the tank from orifice 42.

Cover 16 may be releasably secured to tank 12 by any suitable means such as bolts 26 seated through flange 13 and held in place by nuts 15. The cover also has at least one liquid-carrying conduit 28 and one gas-carrying conduit 30 communicating with the interior of tank 12. Also illustrated is a second liquid-carrying conduit 29 in cover 16. As in base 14, the air-carrying conduit 30 in cover 16 has a check valve 32 located in it to insure that no liquid escapes from tank 12 from the wrong conduit.

As best shown in FIGS. 2 and 3, both air conduit 30 and liquid conduit 28 are in fluid communication with an annular groove 44 in cover 16. Adapter means 46 is sized to fit into a shallow groove 48 in cover 16 (see FIG. 10) and may be either glued or welded in place. Holes 50 are drilled through adapter means 46 and line up with annular groove 44 to provide a plurality of fluid passages through the adapter means. Adapter means 46 itself has a circular annular groove 52, best shown in broken lines in FIG. 10, running along its base-facing side. This groove places holes 50 in the adapter means in fluid communication with the various coupling elements which adapt the apparatus for different operations.

Adapter means 46 also has a centrally located hole 54 which permits access to threaded coupling 56 in cover 16. Depending on which filter configuration is to be used, the coupling element of the particular filter may have a threaded shaft adapted to engage coupling 56. The disc and sleeve filter shown in FIG. 2 as well as the cartridge filter shown in FIG. 5 would have such shafts. As an alternate means of coupling a filter to the adapter means, a groove 58 is provided along the outer edge of adapter means 46 which is adapted to receive the upper edge of a U-shaped clamp 60, best shown in FIG. 3. In the embodiments illustrated in FIGS. 6 and 8, the filter coupling elements of those respective configurations will have a corresponding groove running along their outer edges and adapted to receive the lower edge of clamp 60. The clamp 60 may be slipped over the filter elements, positioned, and then tightened by means of a screw 62 threadingly engaging a corresponding conduit in a manner well known in the art. Of course, alternative attachment means such as a threaded shaft could be used in place of a clamp arrangement to secure the filter elements to the adapter means.

In the embodiment illustrated in FIGS. 1-4, a filter bag 70 is fitted over a series of spaced discs 72 mounted on a shaft 74. Each of the discs 72 has a series of holes 76 therein to permit passage of liquid through the element. The shaft 74 is threaded through hole 54 in adapter means 46 into coupling 56 in cover 16, and the discs are maintained in proper position either by frictional engagement with the shaft or by being snap fitted into a series of notches along the length of the shaft. The disc nearest the end of the shaft is of a smaller diameter than the other discs to acommodate the end of the filter bag. The filter bag is held in position by clamp 60.

The filter bag may be of any suitable woven 5 material such as cellulose acetate, glass, acrylics, polyester, nylon, polyethylene, polypropylene, or cotton. The material used will depend on the size of the particulate contaminants to be filtered and whether the liquid to be filtered is corrosive or contains solvents. The discs and shafts may be fabricated of a suitable plastic material such as polyvinylchloride or the like.

In operation, the disc and sleeve filter configuration illustrated in FIGS. 1-4 removed particulate contaminants from a liquid to be filtered entering through conduit 20. Alternatively, a second inlet 29 in cover 16 can be used. The filtered liquid passes through filter bag 70 upwardly through holes 76 in discs 72 and exits through the conduit 28. As shown in FIG. 1, the pressure of the liquid to be filtered against filter bag 70 causes indentations to appear along its length in those portions between discs 72. Particulate contaminants become trapped and held in these indentations during the filtration cycle. When required, the filter is backwashed and cleaned by pumping liquid through conduit 28 or forcing air under pressure through conduit 30. This internal pressure in the filter bag causes it to snap outwardly and slough off the particulate matter attached to its exterior. This solid particulate matter falls to the bottom of tank 12 where is can be easily removed through sludge discharge outlet 18.

Alternatively, the shaft 74 and discs 72 can be removed from the configuration illustrated in FIGS. 1-4, and the filter apparatus can be operated as a bag filter. In this embodiment, liquid to be filtered would enter through conduit 28, pass outwardly through filter bag 70, and exit through either conduit 20 or conduit 29. Solid particulate matter will become trapped and held in filter bag 70. The bag may be cleaned by removing cover 16, unfastening clamp 60, and dumping out the contents of the bag. To increase the speed of filtration either the interior of bag 70 can be pressurized by air through conduit 30 or a vacuum may be pulled through conduit 22.

A filter cartridge embodiment of the invention is illustrated in FIG. 5. The cartridge has a plurality of hollow, cylindrical filter elements 80 which fit over projecting studs 83 and 85 in a base support member 82 and top support member 84, respectively. The cartridge may be designed for any number of individual filter elements. The two support members are joined by shaft 86 which is permanently attached to top support member 84. Individual filter elements may be added or removed by removing nut 88 and sliding base support member 82 off of shaft 86. Studs 85 are hollow and project through top support member 84 to place the interior of filter elements 80 in fluid communication with annular groove 52 in adapter means 46. The cartridge unit is attached to the adapter means by U-shaped clamp 89 which engages grooves about the circumferential edges of adapter means 46 and top support member 84, respectively.

Filter elements 80 may be formed of cellulosic or other suitable filter media and may be reinforced to be made rigid. The base and top support members, shaft, and nut may be fabricated or any suitable rigid plastic material such as polyvinyl chloride or the like. Although the cartridge may be operated with fewer than the total number of filter elements it is designed to hold, plugs must be placed in those hollow studs 85 which are not supporting a filter element to insure that no unfiltered liquid mixes with filtered liquid.

In operation, liquid to be filtered enters tank 12 through conduit 20, passes inwardly through filter elements 80, and exits through conduit 28. Again, the apparatus may be pressurized or a vacuum may be pulled on the interior of the filter elements to increase the rate of filtration. The filter elements are of the type designed to be discarded after use although elements could be utilized that could be cleaned and reused. Additionally, if needed, a series of filter apparatuses could be provided and connected to perform a plurality of filtering operations on a given process stream. The piping required for such an arrangement is well within the skill of a practitioner in this art.

A tube filter embodiment is illustrated in FIGS. 6 and 7. A plurality of hollow, tubular filter elements 90 are attached to coupling member 92 by means of threaded studs 94 projecting vertically downwardly from the coupling member. The filter elements 90 comprise a rigid lattice 96 formed from a suitable plastic material covered by a layer of a filter medium 98 and enclosed in a sleeve of a woven filter material 100. Bands 104 secure the woven filter material to tubes 90. The coupling member 92 has a plurality of holes therethrough aligned with the threaded studs 94 to place the interior of the tubular filter elements in fluid communication with annular groove 52 in adapter means 46. A U-shaped clamp 102 holds the tubes and support member in position by engaging grooves along the circumferences of the edges of adapter means 46 and coupling member 92.

In operation, liquid to be filtered enters the base of tank 12 through conduit 20 and passes through woven filter material 100, filter medium 98, and lattice 96. Filtered liquid then flows upwardly through the hollow cores of the tubes 90 and out through conduit 28. The filter tubes may be cleaned by backwashing liquid outwardly through their hollow cores. Particulate material held on the exterior surface of woven material 100 is washed to the bottom of tank 12 where it is removed through sludge outlet 18. Again, the apparatus can be pressurized or evacuated via conduits 22 and 30 to increase the rate of filtration.

FIG. 8 illustrates the apparatus of the present invention adapted for use as an ion exchange column. In use, the tank is filled with ion exchange resin. A strainer 110 is positioned over the entrance to conduit 20. Alternatively, conduit 20 could be closed off and the strainer be placed over discharge outlet 18. The strainer, as best illustrated in FIG. 9, comprises a series of flat discs 118 having notches 120 on one side and holes through the center thereof. The discs are stacked and held together by screws 122 and nuts 124. A solid disc 126 seals the base of the strainer while a disc having a vertically extending shoulder 128 is positioned at the opposite end of the strainer. A short piece of conduit 120 snugly fits in the shoulder of the strainer, and the other end of the conduit is adapted to fit into the entrance to conduit 20.

Also illustrated in FIG. 8 is a second strainer attached to coupling member 112. The coupling member contains a plurality of holes therethrough which are in fluid communication with annular groove 52 (not shown in FIG. 8) in adapter means 46. The coupling member is held in position against adapter means 46 by U-shaped clamp 116 which engages grooves running along the respective outer edges of adapter means 46 and coupling member 112. The number of strainers attached to the coupling member may vary depending upon the liquid flow rate through the tank. However, all openings in the coupling member not having a strainer must be closed off by a plug 114 to prevent the escape of any ion exchange resin from the column. The notches 120 in strainers 110 are sized so that ion exchange resin is retained.

In operation, liquid to be treated may be either flowed upwardly or downwardly through the column. Air may be introduced into the column to agitate the liquid and prevent channeling. As needed, the column can be regenerated by draining liquid from the column and then backwashing a regenerating fluid through the column. Either cation or anion exchange resins or mixtures thereof may be used. Alternatively, the tank may be filled with activated carbon, charred wood or vegetable shells, or charcoal and utilized to adsorb impurities from a process liquid.

As can be seen, the apparatus of the present invention may be easily and rapidly adapted to fit a wide variety of needs. In a matter of minutes, the tank can be changed from one mode of filtration to another or can even be switched to operate as an ion exchange column. No other apparatus to my knowledge has the versatility of this apparatus which enables an operator to rapidly and efficiently switch to a mode of filtration which best suits the requirements of a process stream on a given day.

While the apparatus herein described constitutes several preferred embodiments of the invention, it is to be understood that the invention is not limited to this precise apparatus, and that changes may be made without departing from the scope of the invention, which is defined in the appended claims.

What is claimed is:

1. A filter apparatus capable of being converted into a bag filter, a sleeve and disc filter, a cartridge filter, an adsorption column, and an ion exchange column comprising the combination of a filter housing tank, a base connected to said tank and having at least one opening therein for the passage of liquids and at least one opening for the passage of air into said tank, and a cover releasably attached to said tank and having at least one opening therein for the passage of liquids and at least one opening for the passage of air into said tank and further including an adapter means attached to the underside of said cover specifically adapted to interchangeably receive at least two of the following elements:

(a) a filter bag including a body portion with an opening at its top forming a mouth and means to secure said bag to said adapter means, (b) a sleeve and disc filter comprising a shaft, a plurality of spaced, perforated circular discs mounted on said shaft, means on one end of said shaft for securing said shaft to said adapter means, and a filter bag including a body portion adapted to be fitted over said shaft and plurality of discs and an opening at its top forming a mouth adapted to be secured to said adapted means, (c) a cartridge filter arrangement including a base support member having a plurality of vertically upwardly projecting studs, a top support member having a plurality of vertically downwardly projecting hollow studs extending through said member, a plurality of generally cylindrical filter elements having hollow cores, said studs in said support members engaging the respective ends of said filter elements by extending into said hollow cores, and means securing said top and bottom support members to said filter element and said adapter means, (d) a tubular, hollow filter element having a rigid lattice covered by a layer of filter material, one end of said element being closed and the other end of said element being open and having means to secure said filter element to said adapter means, and (e) strainer means, including means to secure said strainer means to said adapter means, for preventing the loss of ion exchange resin from said tank when said apparatus is being used as an ion exchange column;

said adapter means having at least one passage therethrough for providing a fluid connection between said openings in said cover and said elements (a) through (e).

2. The apparatus of claim 1 further including a sludge discharge outlet in said filter housing tank.

3. The apparatus of claim 2 in which said at least one air passage in said base comprises a plurality of passages entering said filter housing tank at an acute angle from vertical.

4. The apparatus of claim 3 in which said adapter means includes a threaded recess adapter to engage the shaft on said sleeve and disc filter.

5. The apparatus of claim 4 in which said adapter means is seated in a shallow circular groove in the underside of said cover means.

6. The apparatus of claim 5 in which said adapter means includes an annular groove circling the underside thereof adapted to align with openings in said elements (a) through (e) to provide a fluid connection therethrough.

7. The apparatus of claim 6 in which said adapter means has a plurality of holes passing vertically therethrough adapted to be aligned with an annular groove on the underside of said cover means which is in fluid connection with said at least one opening for the passage of liquids and said at least one opening for the passage of air.

8. The apparatus of claim 7 in which said means to secure said filter elements to said adapter means includes a U-shaped clamp means encircling the upper portions of said filter elements.

9. The apparatus of claim 8 in which said adapter means includes a groove circling the outer edge thereof adapted to receive the upper edge of said U-shaped clamp means.

* * * * *